United States Patent [19]

Asai et al.

[11] Patent Number: 5,373,816
[45] Date of Patent: Dec. 20, 1994

[54] EXHAUST CONTROL DEVICE FOR A TWO MOTOR CYCLE ENGINE

[75] Inventors: Masahiro Asai; Yoici Ishibashi; Shinichi Isomura; Osamu Kudou, all of Saitama, Japan

[73] Assignee: Honda Giken Kogyo Kabushiki Kaisha, Tokyo, Japan

[21] Appl. No.: 178,860

[22] Filed: Jan. 7, 1994

[30] Foreign Application Priority Data

Jan. 8, 1993 [JP] Japan ................................ 5-016791

[51] Int. Cl.$^5$ ........................................ F02B 75/02
[52] U.S. Cl. ............................ 123/65 PE; 123/323
[58] Field of Search ............... 123/65 PE, 323, 65 V, 123/65 P; 60/312, 314

[56] References Cited

U.S. PATENT DOCUMENTS

| | | | |
|---|---|---|---|
| 4,938,178 | 7/1990 | Schlunke et al. | 123/65 PE |
| 4,993,373 | 2/1991 | Klomp et al. | 123/65 PE |
| 5,063,887 | 11/1991 | Ozawa et al. | 123/65 PE |

FOREIGN PATENT DOCUMENTS 0404341 12/1990 European Pat. Off.

*Primary Examiner*—David A. Okonsky

[57] ABSTRACT

An exhaust control device for a two-cycle engine which does not impart a change of a shape of an exhaust passage. An exhaust control device is provided in an exhaust port opening to an inner peripheral surface of a cylinder hole of a two-cycle engine wherein a cylinder wall portion adjacent to the exhaust port is formed with a rotational face obtained by rotating an arc having substantially the same curvature as the inner peripheral surface of the cylinder hole about a rotational axis $C_1$ extending at a right angle to an axis C of the cylinder hole in the outside of the cylinder hole and a recess defined by both ends at a right angle to the rotational axis $C_1$ and in communication with the exhaust port. Within the recess is mounted an exhaust passage member having an exhaust passage in communication with the exhaust port and having an external shape substantially similar to the recess with a predetermined clearance formed relative to the recess in a portion above at least an upper edge of the exhaust port of the rotational face portion and the both end portions. A valve body is provided which comprises arm portions respectively inserted into the clearance in the both end portions and supported for swinging about the rotational axis $C_1$ and a control face portion provided by connecting ends of the arm portions together and movable in and out of the clearance in the rotational face portion in response to the swinging of the arm portions.

6 Claims, 5 Drawing Sheets

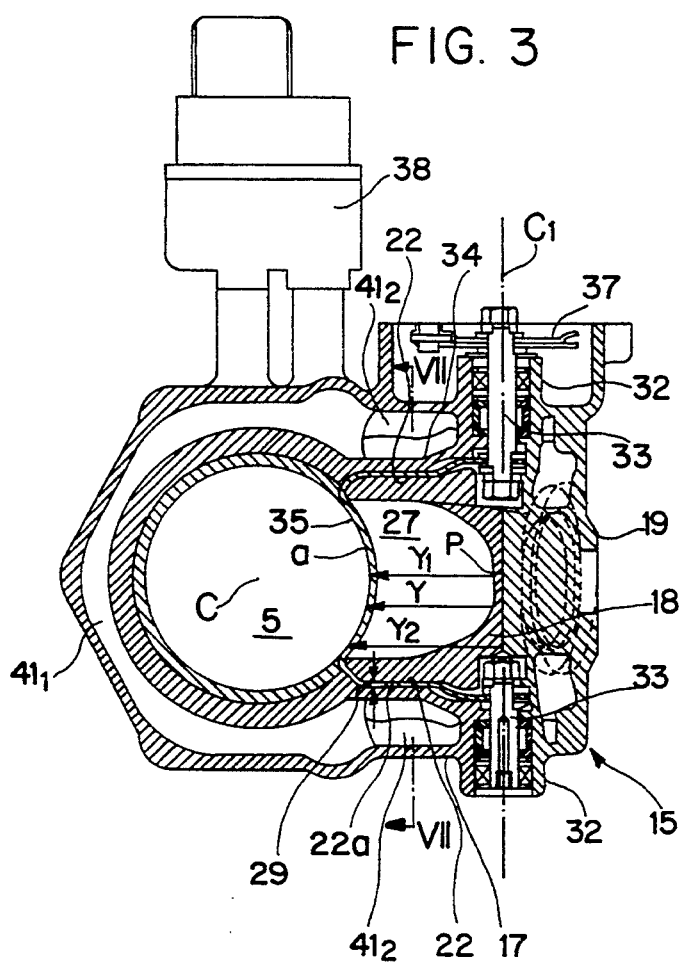
FIG. 3
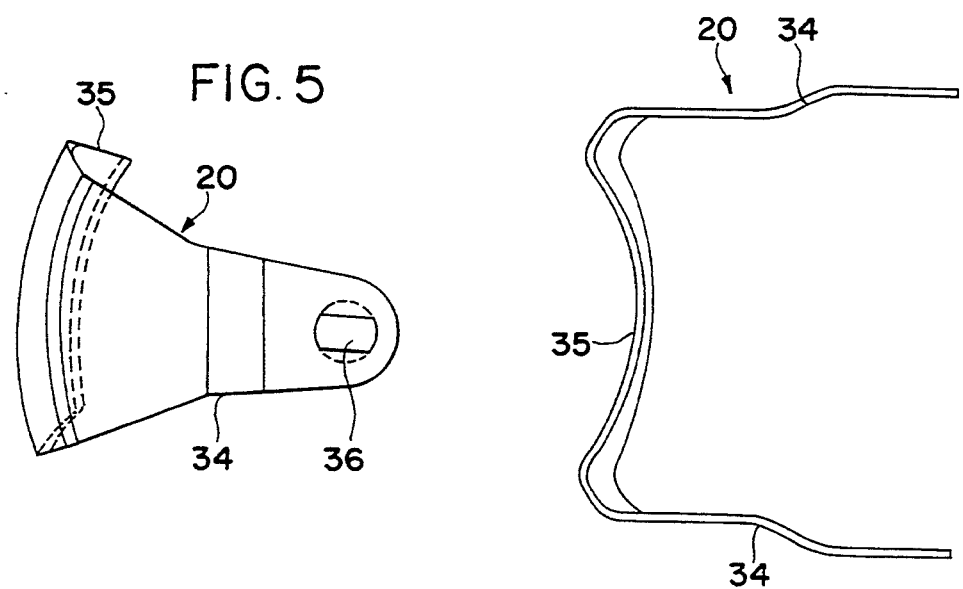
FIG. 5
FIG. 4

EXHAUST CONTROL DEVICE FOR A TWO MOTOR CYCLE ENGINE

BACKGROUND OF THE INVENTION

1. Field of the Invention

The present invention relates to an exhaust control device provided in an exhaust port opening on an inner peripheral surface of a cylinder hole of a two-cycle engine.

2. Description of Background Art

In a two-cycle engine an exhaust port and a scavenging port formed in an inner peripheral surface of a chlinder hole are opened and closed by a piston. Fresh air is compressed within a crank chamber and is fed from the scavenging port into a cylinder chamber. Exhaust gas is discharged out of the exhaust port. A "blow-by" occurs wherein during an up stroke of the piston, a portion of the fresh air is discharged out of the exhaust port during a period from the closure of the scavenging port to the closure of the exhaust port. A procedure has been heretofore carried out in order to reduce the blow-by of fresh air such that an exhaust control valve is provided in an exhaust port so that when the engine is operated with a low load, the upper portion of the exhaust port is closed, and when the engine is operated with medium and high loads, the exhaust port is fully opened to change the timing of the opening and closing of the exhaust port.

In such an exhaust control valve as described, Japanese Utility Model Publication No. 54336/81 discloses a rotary control valve in which a body portion is formed to be a substantially drum shape in the form of a recessed arc along the inner peripheral wall of the cylinder, and the surface of said body portion is positioned as close as possible to an exhaust port. The body surface of the control valve substantially functions as an upper edge of the exhaust port, and the body portion is scooped out so as to have substantially the same shape as the wall surface of the exhaust passage when the control valve is in a fully opened position.

Japanese Patent Application Laid-Open Publication No. 23523/87 discloses an exhaust control valve in which said valve is provided above an exhaust passage extending outwardly from an exhaust port opening to an inner surface of a cylinder, and a control surface having substantially the same curvature as the inner surface of the cylinder and matching to the inner surface of the cylinder is provided at the swinging end of the valve body supported for swinging by a shaft disposed perpendicularly intersecting to the cylinder axis. In the upper portion of the exhaust passage is provided a recess in which the valve body is received when the exhaust port is fully opened.

Further, Japanese Patent Application Laid-Open Publication No. 33426/91 also discloses an exhaust control valve in which similarly to the former, a control surface (a flow shutoff cover) is provided at the swinging end of a valve body (main body) supported for swinging within an exhaust passage. In Japanese Publication No. 33426/91, the control surface is in the form of a flexible sheet, which is received into a slot-like cavity provided in the upper wall of the exhaust passage.

In FIGS. 7 and 8 of the aforementioned publication, there is shown an arrangement wherein a housing is provided within an exhaust passage, and said slot-like cavity is formed by a clearance between the outer surface of the upper wall of the housing and the inner surface of the upper wall of the exhaust passage. The housing is provided within the exhaust passage with both side walls thereof placed in contact with both side walls of the exhaust passage. The valve body for swinging the control surface is disposed internally of the exhaust passage along the inner surface of the housing side wall.

SUMMARY AND OBJECTS OF THE INVENTION

In any of the aforementioned conventional exhaust control valves, a working member is positioned within the exhaust passage. Therefore, the sectional shape or the inner surface shape of the exhaust passage varies from a predetermined shape determined in terms of performance due to the presence of the working members and is varied by even the operation of the working members, which causes the lowering of output.

The present invention has been developed in view of the foregoing. According to the present invention, there is provided, in a two-cycle engine in which a rotational shaft extending at a right angle to a cylinder axis and a valve body supported on said rotational shaft are provided in an exhaust passage extended from an exhaust port opening to an inner peripheral surface of a cylinder hole, said valve body varying a height of an upper edge of said exhaust port, an exhaust control device wherein said valve body is formed by a thin shell-like member comprising an exhaust control portion substantially along a cylinder curvature in said exhaust port and having a width wider than the whole width of said exhaust port and a swinging arm portion for connecting at least a side portion of said exhaust control portion and said rotational shaft, and a receiving recess for receiving the whole valve body is formed in a cylinder block formed with said exhaust passage, said receiving recess being communicated with said exhaust passage only in a working zone of the exhaust control portion of said valve body, said swinging arm of said valve body being always received in said receiving recess.

According to the present invention, the swinging arm portion of the valve body is always received in the receiving recess communicated with the exhaust passage only in the working zone of the exhaust control portion, and the shape of the exhaust passage is not affected by the installation and operation of the valve body. Therefore, it is possible to prevent the output from being lowered.

Furthermore, the valve body is formed from a thin shell-like member, and the exhaust control portion of the valve body can be moved up and down at a position sufficiently close to the exhaust port. Therefore, it is possible to precisely control the exhaust timing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a sectional view taken along the line III-III of FIG. 1;

FIG. 4 is an enlarged top view of a valve body;

FIG. 5 is an enlarged side view of a valve body;

DETAILED DESCRIPTION OF THE PREFERRED EMBODIMENTS

Figure 1:
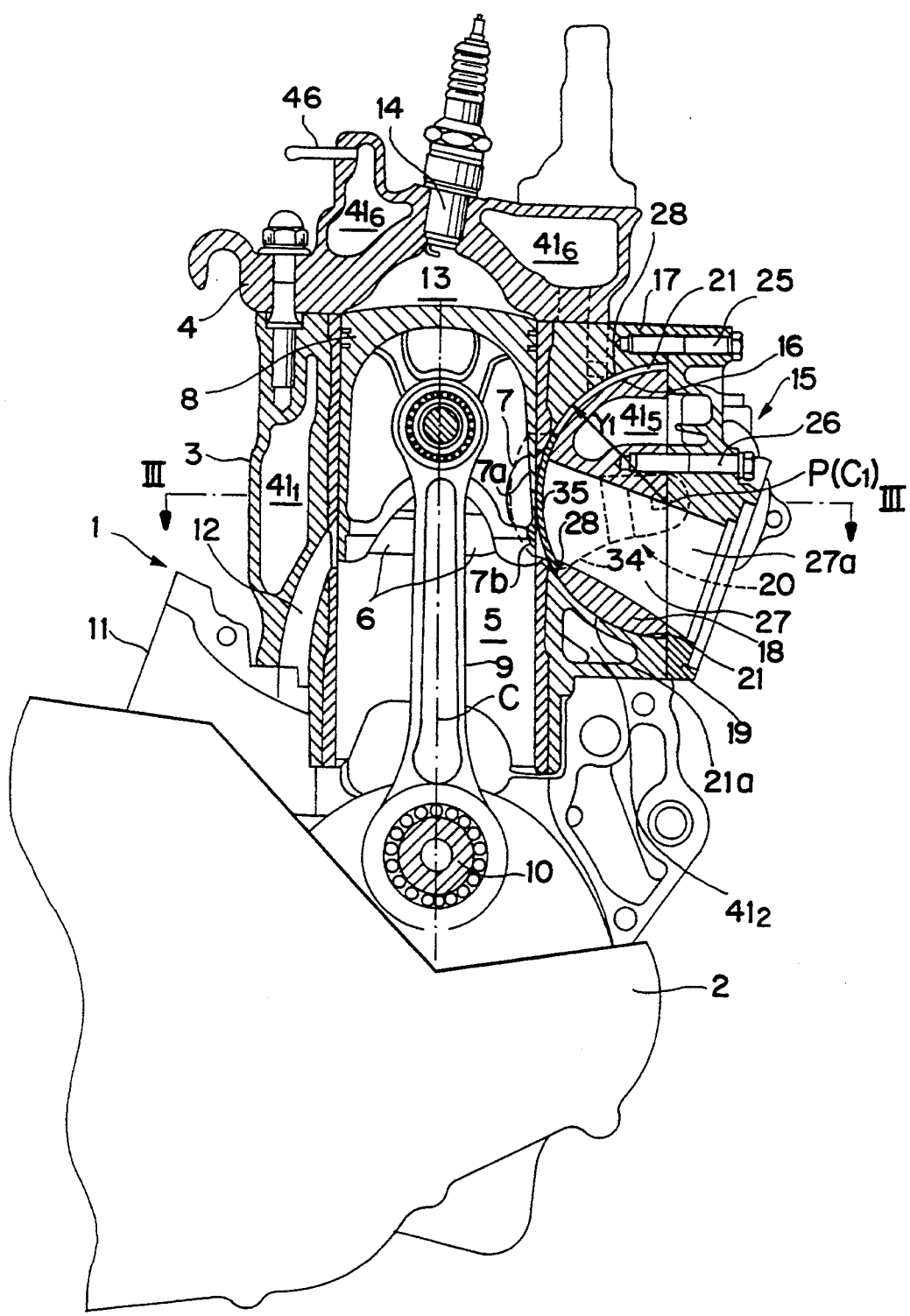
FIG. 1 is a side view of a two-cycle engine provided with an exhaust control device according to the present invention with a cylinder portion thereof longitudinally sectioned.

FIG. 1 is a side view of a two-cycle engine 1 provided with an exhaust control device according to the present invention, with a cylinder portion longitudinally sectioned. A crank case 2, a cylinder block 3 and a cylinder head 4 are operatively connected together and form a cylinder. A scavenging port 6 and an exhaust port 7 are open to an inner peripheral surface of a cylinder hole 5 formed in the cylinder block 3 and opened and closed by a piston 8 which slidably moves up and down within the cylinder hole 5. A connecting rod 9 and a crank pin 10 are operatively connected to the piston 8.

At the time of the up-stroke of the piston 8, fresh air is taken into the crank case 2 from an intake port 11. At the time of the down-stroke of the piston 8, the fresh air is compressed and then fed into a cylinder chamber upwardly of the piston 8 via an intake passage 12 and the scavenging port 6. Exhaust gas within the cylinder chamber is discharged out of the exhaust port 7. When the scavenging port 6 is closed and the exhaust port 7 is then closed by the upward movement of the piston 8, a mixed gas within the cylinder chamber is thereafter compressed by the piston 8 and fired by an ignition plug 14 adjacent to a combustion chamber 13.

There occurs a "blow-by" wherein by the upward movement of the piston 8, a part of fresh air fed into the cylinder chamber is discharged out of the exhaust port 7 during a period from the closure of the scavenging port 6 to the closure of the exhaust port 7. This blow-by is great at the time of operation under low load (low rotation) at which the speed of the piston is slow. Therefore, at the time of the low-load operation, the upper portion of the exhaust port 7 is closed to quicken its closing timing, and an exhaust control device 15 is provided on the cylinder block 3 formed with the exhaust port 7 in order to lessen the blow-by of fresh air.

The exhaust control device 15 is composed of a cylinder wall portion 17 formed with a recess 16, an exhaust passage member 18 mounted within the recess 16, a cover member 19 for covering the cylinder wall portion 17 and the exhaust passage member 18 from the outside, and a valve body 20 inserted between the recess 16 and the exhaust passage member 18.

In the longitudinal section of FIG. 1, the recess 16 formed in the cylinder wall 17 is semicircular in shape having a radius $\gamma_1$ in contact with an inner peripheral surface of the cylinder hole 5 about a point P. As will be understood from the cross section of FIG. 3, the radius $\gamma$ within the other longitudinal section parallel with the longitudinal section of FIG. 1 gradually increases to radii $\gamma_2$ on both sides along an axis $C_1$ at a right angle to an axis C of the cylinder hole 5 passing the point P, and a line continuous to the outer ends of these radii $\gamma$ forms an arc "a" having substantially the same curvature as the cross sectional shape of the cylinder hole 5. That is, the face portion shown in FIG. 1 of the recess 16 is a rotational face obtained by rotating the arc "a" having substantially the same curvature as the inner peripheral surface of the cylinder hole 5 about the axis $C_1$. Hereinafter, the face portion is called the rotational face portion 21, and the axis $C_1$ is called the rotational axis.

Figure 6:
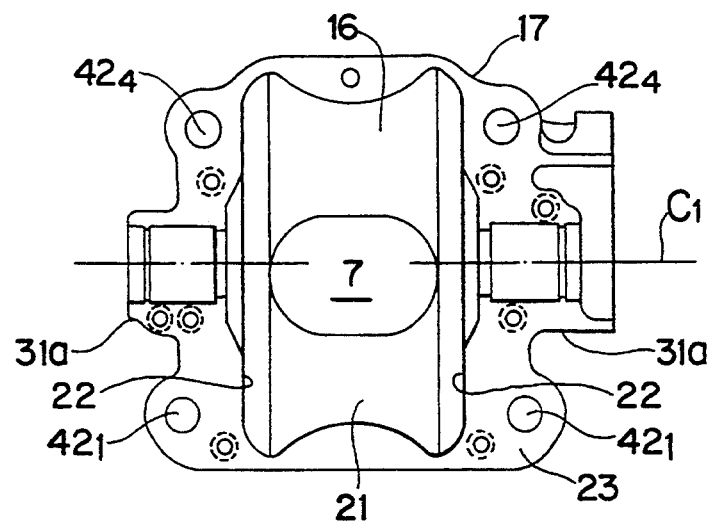
FIG. 6 is a front view of a cylinder wall portion.

The rotational face portion 21 is connected to end portions 22 each having a plane at a right angle to the axis $C_1$ at both ends in the direction of the rotational axis $C_1$. That is, the recess 16 is defined by the rotational face portion 21 and the end portions 22 are opened outwardly. FIG. 6 is a front view of the cylinder wall portion 17 formed with the recess 16 as described. The cylinder wall portion 17 has flat mating faces 23 on both sides with the recess 16 sandwiched therebetween, and is in communication with the exhaust port 7 in the central portion thereof.

The exhaust passage member 18 mounted within the recess 16 has a contour substantially similar to the recess 16. That is, the exhaust passage member 18 comprises a rotational face portion 21a along the rotational face portion 21, end portions 22a along the end portions 22, and an outer end 24, see FIG. 8, having the same surface as the mating surface 23 of the cylinder wall portion 17 along the open surface of the recess 16. The exhaust passage member 18 is secured through a bolt 26 to the cover member 19 which is secured through a bolt 25 to the cylinder wall portion 17 as shown in FIG. 1, and thus is fixed with respect to the cylinder wall portion 17 and encased in the recess 16. The exhaust passage member 18 is interiorly formed with an exhaust passage 27 in communication with the exhaust port 7.

Between the rotational face portion 21 of the recess 16 and the rotational face portion 21a of the exhaust passage member 18 is provided a clearance 28 having a predetermined spacing above an upper edge 7a of the exhaust port 7. The clearance 28 extends to a position slightly beyond a lower edge 7b of the exhaust port 7, see FIG. 1. Further, also between each end portion 22 of the recess 16 and each end portion 22a of the exhaust passage member 18 is provided a clearance 29 having a predetermined spacing, see FIG. 3.

Figure 9:
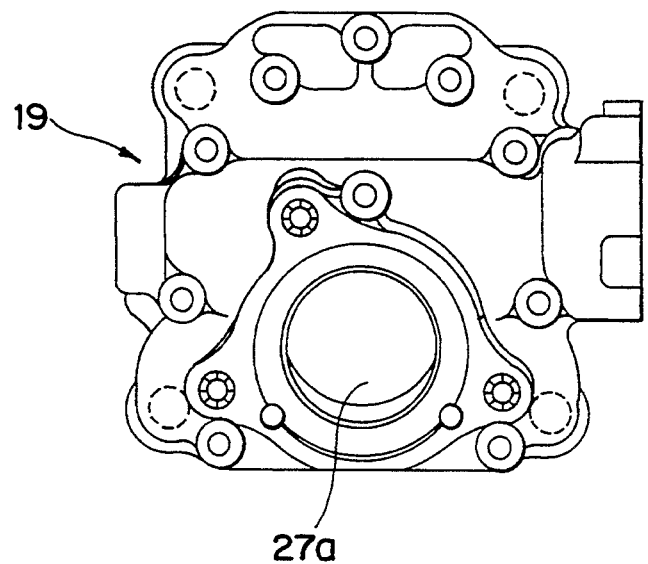
FIG. 9 is a front view of a cover member.
Figure 10:
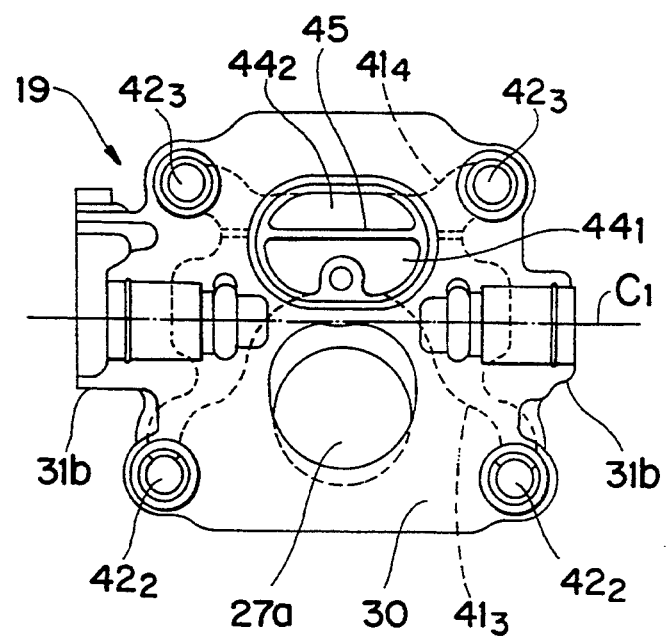
FIG. 10 is a rear view of a cover member.

FIG. 9 is an external view of a cover member 19, and FIG. 10 is a rear view thereof. The back surface of the cover member 19 has a flat mating surface 30 having the same surface as the mating face 23 of the cylinder wall portion 17 and the outer end 24 of the exhaust passage member 18. The mating face 30 is placed in abutting contact with the mating face 23 and the outer end 24, and the cover member 19 is secured to the cylinder wall portion 17 and the exhaust passage member 18 by means of bolts 25 and 26 as previously mentioned. The cover member 19 is formed with an exhaust passage 27a continuous to the exhaust passage 27 of the exhaust passage member 18, and the exhaust port 7 is connected to an external exhaust pipe not shown through these exhaust passages 27 and 27a.

The mating face 23, FIG. 6, of the cylinder wall portion 17 and the mating face, FIG. 10, of the cover member 19 are respectively formed with a pair of bearing boss portions 31a and 31b which are opposed from both sides along the rotational axis $C_1$. When the cylinder wall portion 17, the exhaust passage member 18 and the cover member 19 are assembled, a pair of bearing bosses 32 are formed, as shown in FIG. 3, by these bearing boss portions 31a and 31b. A valve body driving shaft, a rotational shaft, is rotatably supported on the bearing bosses 32.

FIG. 4 is an enlarged top view of a valve body 20, and FIG. 5 is an enlarged side view thereof. As will be further understood from FIGS. 4 and 5, the valve body 20 is a thin shell-like member formed from a plate processed article, for example, such as a stainless steel plate, and is provided with a pair of arm portions (swinging arm portions) 34, and a control face portion (an exhaust control portion) 35 for connecting ends of these arm portions 34 together. The arm portion 34 is provided at it base end with a flat engaging hole 36. The arm portion 34 is inserted into a clearance 29 formed between the recess 16 and the end portions 22, 22a of the exhaust passage member 18 with the engaging hole 36 engaged with a portion chamfered into a similar shape of the valve body driving shaft 33. Accordingly, the arm portion 34 oscillates integral with the valve body driving shaft 33 within the clearance 29.

The control face portion 35 is formed to be wider than the whole width of the exhaust port 7 and molded into a rotational surface having the same shape as the aforementioned rotational surface with respect to the rotational face portion 21 of the recess 16. When the arm portion 34 oscillates about the rotational axis $C_1$ integral with the valve body driving shaft 33, the control face portion 35 is accordingly freely moved in and out of the clearance 28 between the rotational face portions 21 and 21a. Accordingly, the exhaust timing can be adjusted in accordance with the operating conditions by completely encasing the control face portion 35 into the clearance 28 to fully open the exhaust port 7 or projecting the control face portion 35 from the upper edge 7a of the exhaust port 7 to close the upper portion of the exhaust port 7.

As will be understood from the foregoing, in the present embodiment, the recess 16 constitutes a receiving recess for receiving the whole valve body 20. The receiving recess is communicated with the exhaust passage 27 only in the working zone of the control face portion (exhaust control portion) 35, and the arm portion (swinging armportion) 34 is always received in the receiving recess i.e. the clearance 29.

Since the clearance 28 extends to a position beyond the lower edge 7b of the exhaust port 7, the control face portion 35 can be moved down to said position to fully close the exhaust port 7. This configuration can be advantageously applied, for example, to the case where the loss of heat caused by exhaust is impeded at a certain period of cycle to promote natural firing of a mixture within the cylinder chamber so that a good combustion state is maintained along with the ignition by way of an ignition plug 14.

Figure 2:
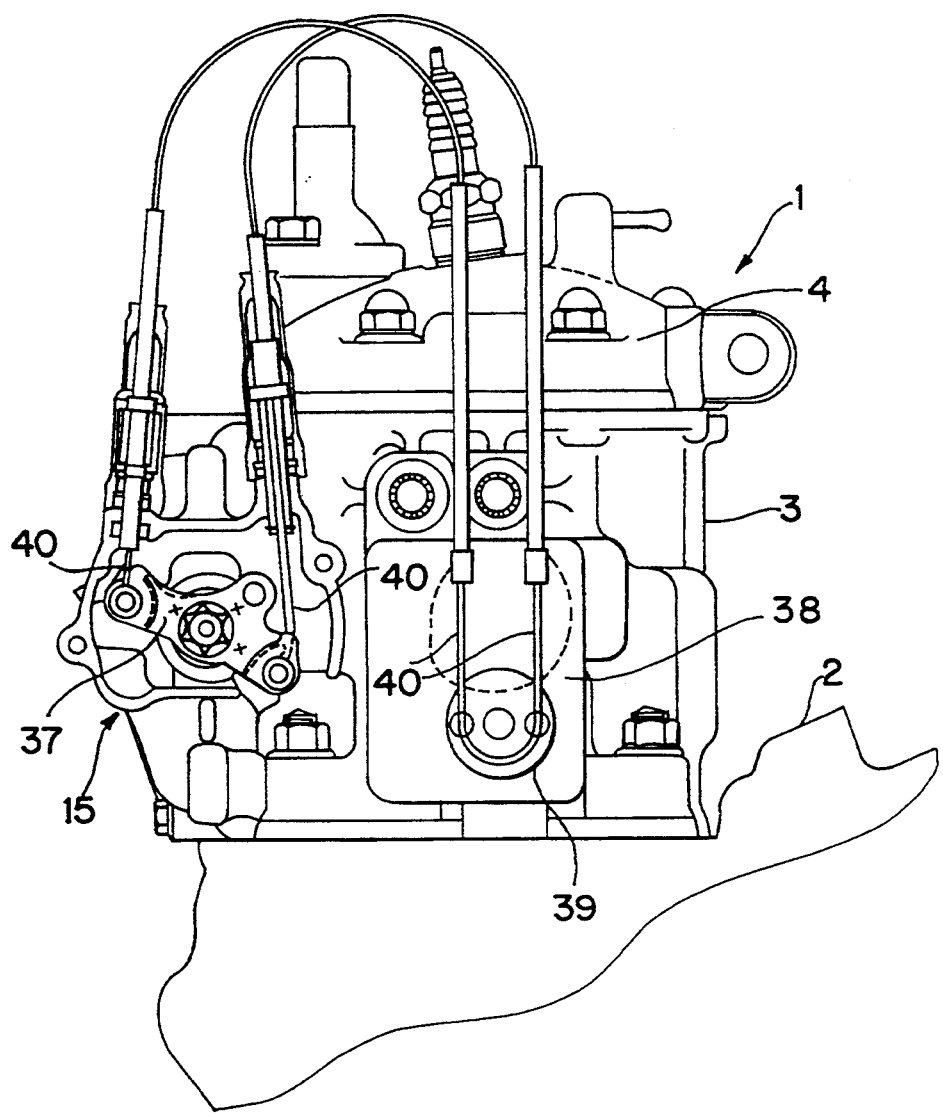
FIG. 2 is a side view of a cylinder portion showing the side opposite to that of FIG. 10.

One valve body driving shaft 33 projects externally from the cylinder block 3, and a driving lever 37 for driving the valve body driving shaft 33 projects from said shaft toward both sides and is fixedly mounted thereto. FIG. 2 is a side view showing the side where the driving lever 37 for the cylinder block 7 is disposed. As shown in FIG. 2, a servomotor 38 is mounted on said side. A diving cable 40 is passed over a pulley 39 providing an output shaft of the servomotor 38, and both ends of the driving cable 40 are connected to both ends of the driving cable 37. Accordingly, the opening and closing operation of the exhaust port by the control face portion 35 of the valve body 20 is controlled by the servomotor 38.

In the exhaust control device 15 thus configured, the arm portion 34 of the valve body 20 is not positioned interiorly of the exhaust passage 27 but disposed externally of the exhaust passage member 18 formed with the exhaust passage 27. Therefore, the shape of the exhaust passage 27 is not changed to bring forth the lowering of output by the provision of the valve body 20 and the operation thereof. Further, since the control face portion 35 of the valve body 20 is moved up and down at a position sufficiently close to the exhaust port 7, it is possible to precisely control the exhaust timing. In addition, the exhaust port 7 can be fully closed as previously mentioned.

The exhaust control device 15 constituted by the cylinder wall portion 17, the exhaust passage member 18, the cover member 19 and the valve body 20 is wholly cooled by cooling water which circulates through various portions.

A cooling water circulating system within the exhaust control device 15 will be described hereinafter.

Figure 7:
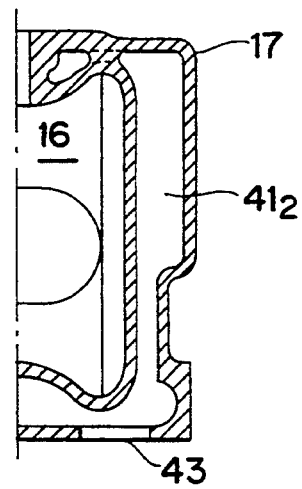
FIG. 7 is a sectional view taken along the line VII-VII of FIG. 3.

First, the cylinder wall portion 17 is provided with a cooling water passage $41_2$ in communication with a cooling water passage $41_1$ provided on the cylinder block 3 encircling the cylinder hole 5, FIGS. 1 and 3. This cooling water passage $41_2$ is disposed so as to surround the recess 16 from the bottom toward both sides thereof as shown in FIG. 7 and is communicated with connecting ports $42_1$ which are open to the lower portions on both sides of the mating face 23 of the recess 16. Cooling water is introduced into the cooling water passages $41_1$ and $41_2$ through a cooling water inlet 43, FIG. 7.

The connecting port $42_2$ registered with the connecting port $42_1$ is provided in the mating face 30 of the cover member 19 in contact with the mating face 23 of the recess 16, FIG. 10, and the cover member 19 is interiorly formed with a cooling water passage $41_3$ in communication with the connecting port $42_2$. This cooling water passage $41_3$ is opened to the mating face 30 through the opening portion $44_1$. The mating face 30 is also provided with other connecting ports $42_3$ on both upper sides, and a cooling water passage $41_4$ in communication therewith is opened to the mating face 30 through the opening portion $44_2$ adjacent to the opening portion $44_1$. The opening portion $44_1$ is separated from the opening portion $44_2$ by a diaphragm 45.

Figure 8:
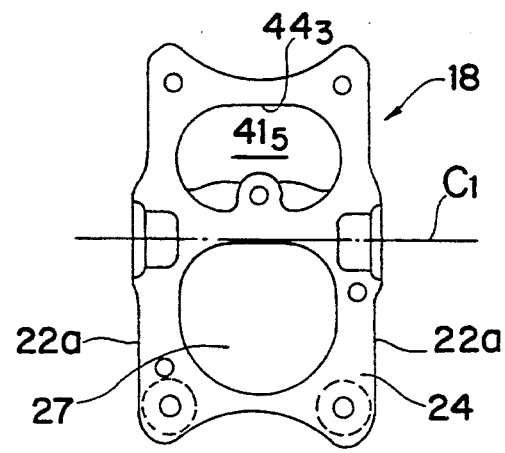
FIG. 8 is a front view of an exhaust passage member.

The exhaust passage member 18 is further provided with a cooling water passage $41_5$ which is opened to the outer end 24 through the opening portion $44_3$ as shown in FIGS. 1 and 8. This cooling water passage $41_5$ is in the form of a bag which communicates with the exterior only at the opening portion $44_3$. The opening portion $44_3$ is matched to the opening portions $44_1$ and $44_2$ of the cover member 19.

The cooling water supplied from the cooling water inlet 43 to the cylinder block 3 flows into the cooling water passage $41_5$ via the cooling water passage $41_2$, the connecting ports $42_1$, $42_2$, the cooling water passage $41_3$, and the opening portions $44_1$, $44_3$, and after this, again passes through the opening portion $44_3$ from the cooling water passage $41_5$. The cooling water then enters into the cooling water passage $41_4$ through the opening portion $44_2$, during a period of which the cylinder wall portion 17, the cover member 19 and the exhaust passage member 18 are cooled thereby.

The connecting port $42_3$ of the cover member 19 is matched to the other connecting port $42_4$, FIG. 6, which is opened to the mating face 23 of the exhaust port 7.

The aforesaid cooling water enters into other cooling water passage (not shown) provided in the cylinder wall portion 17 through the connecting port $42_4$ from the connecting port $42_3$ and thence is guided to a cooling water passage $41_6$, FIG. 1, provided in the cylinder head 4 to cool the cylinder head 4, after which the cooling water is discharged out of the cooling water outlet 46.

According to the present invention, the swinging arm portion of the valve body is separated from the exhaust passage and disposed externally thereof, and the shape of the exhaust passage is not affected by the provision of the valve body and operation thereof. Therefore, the lowering of output caused by the change of the shape of the exhaust passage can be prevented.

Moreover, since the exhaust control portion of the valve body can be moved up and down at a position sufficiently close to the exhaust port, the exhaust timing can be precisely controlled. Furthermore, the exhaust port can be fully closed by the exhaust control portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a two-cycle engine having a rotational shaft extending at substantially a right angle to a cylinder axis and a valve body supported on said rotational shaft, said valve body being operatively mounted in an exhaust passage extended from an exhaust port opening to an inner peripheral surface of a cylinder hole, said valve body varying a height of an upper edge of said exhaust port, an exhaust control device for a two-cycle engine comprising:

a shell-like member forming said valve body, said shell-like member includes an exhaust control portion extending substantially along a cylindrical curvature in said exhaust port and having a greater width relative to the width of said exhaust port and a swinging arm portion for connecting at least a side portion of said exhaust control portion and said rotational shaft; and a receiving recess for receiving the valve body, said receiving recess being formed in a cylinder block including said exhaust passage, said receiving recess being in communication with said exhaust passage only in a working zone of the exhaust control-portion of said valve body, said swinging arm of said valve body being always received in said receiving recess.

2. A valve body for use in a two-cycle engine having a rotational shaft extending at substantially a right angle to a cylinder axis said valve body being supported on said rotational shaft and being operatively mounted in an exhaust passage extended from an exhaust port opening to an inner peripheral surface of a cylinder hole, said valve body comprising:

a control face; and at least one arm portion being operatively connected to said control face and a distal end being operatively connected to said rotational shaft;

said control face having a first predetermined surface area and extending substantially along a curvature in said exhaust port, said exhaust port having a second predetermined area, the first predetermined surface area of said control face having a greater width relative to a width of the second predetermined area of said exhaust port;

a receiving recess for receiving the control face and said at least one arm portion, said receiving recess being formed in a cylinder block adjacent to said exhaust passage, said receiving recess being in communication with said exhaust passage only in a working zone of the exhaust control portion of said valve body, said swinging arm of said valve body being received in said receiving recess.

3. The valve body according to claim 2, and wherein said control face includes a first end and a second end, said at least one arm portion being operatively mounted relative to said first end of said control face and a second arm portion being operatively mounted to said second end of said control face.

4. The valve body according to claim 2, and further including a servomotor, said servomotor being operatively connected to said rotational shaft for imparting a rotary motion to at least one arm portion.

5. The valve body according to claim 4, and further including at least one cable operatively connected to said servomotor and said at least one arm portion for transmitting motion from said servomotor to said at least one arm portion.

6. The valve body according to claim 2, wherein said control face includes an arcuate shape for conforming to and selectively sealing a cylindrical hole of a piston chamber in which said exhaust port opening is formed.

* * * * *